(12) United States Patent
Klein (10) Patent No.: US 7,287,027 B2
(45) Date of Patent: Oct. 23, 2007

(54) SYSTEM AND METHOD FOR ENTERING A DEFAULT FIELD VALUE THROUGH STATISTICAL DEFAULTING

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 479 days.

(21) Appl. No.: 10/788,288

(22) Filed: Mar. 1, 2004

(65) Prior Publication Data

US 2005/0192976 A1    Sep. 1, 2005

(51) Int. Cl.
*G06F 7/00*      (2006.01)
*G06F 17/30*    (2006.01)
*G06F 15/38*    (2006.01)

(52) U.S. Cl. .............................. 707/6; 704/4

(58) Field of Classification Search ................ 707/3–4, 707/6–7; 364/900, 709, 177, 173; 345/157, 345/169; 704/4; 715/531
See application file for complete search history.

(56) References Cited

U.S. PATENT DOCUMENTS

| | | | | |
|---|---|---|---|---|
| 4,744,050 A | * | 5/1988 | Hirosawa et al. | 704/4 |
| 5,748,512 A | * | 5/1998 | Vargas | 708/142 |
| 5,748,899 A | * | 5/1998 | Aldrich | 709/222 |
| 5,784,069 A | * | 7/1998 | Daniels et al. | 345/467 |
| 5,867,811 A | * | 2/1999 | O'Donoghue | 704/1 |
| 5,963,671 A | * | 10/1999 | Comerford et al. | 382/230 |
| 6,373,473 B1 | * | 4/2002 | Sakaguchi et al. | 345/173 |
| 6,573,844 B1 | * | 6/2003 | Venolia et al. | 341/22 |
| 2005/0270270 A1 | * | 12/2005 | Chadha | 345/157 |

* cited by examiner

*Primary Examiner*—Don Wong
*Assistant Examiner*—Hung Tran Vy
(74) *Attorney, Agent, or Firm*—Finnegan, Henderson Farabow, Garrett & Dunner, L.L.P.

(57) ABSTRACT

Principles of the present invention provide a method of entering a default field value in a second data entry field based on a user's current entry in a first data entry field. The method establishes a relational index table, the relational index table including at least one record having at least three fields. The fields include: a parent field containing a prior entry in the first data entry field; a child field containing an associated prior entry in the second data entry field; and a frequency field including a count of the number of times the prior entry in the first data entry field was associated with the prior entry in the second data entry field. The method further includes: receiving the user's current entry in the first data entry field; and looking up the user's current entry in the first data entry field in the parent field of the relational index table and returning the associated prior entry in the child field as the default field value.

18 Claims, 8 Drawing Sheets

Figure 1

| Area Code /215 | Zip Code /220 | Count /225 |
|---|---|---|
| 404 | 30308 | 2 |
| 404 | 30311 | 5 |
| 770 | 30338 | 4 |
| 770 | 30335 | 3 |
| 678 | 30223 | 9 |

210

| Area Code /235 | Frequency /240 |
|---|---|
| 404 | 7 |
| 770 | 7 |
| 678 | 9 |

230

| Zip Code /255 | Frequency /260 |
|---|---|
| 30308 | 2 |
| 30311 | 5 |
| 30338 | 4 |
| 30335 | 3 |
| 30223 | 9 |

SYSTEM AND METHOD FOR ENTERING A DEFAULT FIELD VALUE THROUGH STATISTICAL DEFAULTING

TECHNICAL FIELD

This invention relates generally to methods and systems for entering field data into a form, and more specifically to methods and systems for entering a default field value through the use of statistical defaulting.

BACKGROUND

Anything that can assist users in entering data into computer systems saves time, money, and frustration. When entering large amounts of similar or identical data, users appreciate the existence of systems with the intelligence to make good predictions of possible input. Mechanisms such as shell histories or list boxes that remember previous input for some fields are well known today.

A prior art approach to predicting input is to collect a recent window of entries that were entered into a field as a collection of prior entries. When the user begins to type data into the field, the system examines the input keystrokes and may display in the input field one or more matching prior entries from the collection. The system may also offer a drop down list box displaying a list of potential entries. The user may then "arrow down" or select one of the matching entries, and, thus, does not need to type more than a few keystrokes in order to enter data into the field. An example of the prior art approach can be seen in many Microsoft products, for example, the Internet Explorer address field.

By examining only the prior entry data associated with the current, user-selected entry field, the prior art approach fails to take a holistic look at the entry screen. Data entry screens often contain more than one data field. The prior art fails to examine how data entries in a first field may be related to data entries in a second field, and, further fails to use any such relationship when providing the type-ahead or lookup features. For example, it is often the case on a data entry screen for a shipping address that a zip code and an area code are entered. Usually, an area code will be associated with only one, two, or three zip codes. The systems knowledge of the user entered area code should provide the system with good estimates of possible zip codes, prior to any typing from the user. The prior art approach fails to take the relationship between fields into account.

SUMMARY

A system for entering a default field value in a second data entry field based on a user's current entry in a first data entry field consistent with the present invention includes a microprocessor and memory coupled to the microprocessor. The microprocessor is operable to: establish a relational index table, the relational index table including at least one record having at least three fields. The fields include: a parent field containing a prior entry in the first data entry field; a child field containing an associated prior entry in the second data entry field; and a frequency field including a count of the number of times the prior entry in the first data entry field was associated with the prior entry in the second data entry field. The microprocessor is further operable to: receive the user's current entry in the first data entry field; and look up the user's current entry in the first data entry field in the parent field of the relational index table and return the associated entry in the child field as the default field value.

A method of entering a default field value in a second data entry field based on a user's current entry in a first data entry field consistent with the present invention includes: establishing a relational index table, the relational index table including at least one record having at least three fields. The fields include: a parent field containing a prior entry in the first data entry field; a child field containing an associated prior entry in the second data entry field; and a frequency field including a count of the number of times the prior entry in the first data entry field was associated with the prior entry in the second data entry field. The method further includes: receiving the user's current entry in the first data entry field; and looking up the user's current entry in the first data entry field in the parent field of the relational index table and returning the associated entry in the child field as the default field value.

An article of manufacture consistent with the present invention contains instructions for entering a default field value in a second data entry field based on a user's current entry in a first data entry field. The instructions establish a relational index table, the relational index table including at least one record having at least three fields. The fields include: a parent field containing a prior entry in the first data entry field; a child field containing an associated prior entry in the second data entry field; and a frequency field including a count of the number of times the prior entry in the first data entry field was associated with the prior entry in the second data entry field. The instructions further receive the user's current entry in the first data entry field; and look up the user's current entry in the first data entry field in the parent field of the relational index table and return the associated entry in the child field as the default field value.

A further method consistent with the present invention of entering a default field value in a data entry field based on prior entries in the data entry field includes: establishing a frequency index table, the frequency index table including two or more records having at least two fields. The fields include: a parent field containing a prior entry in the data entry field; and a frequency field including a count of the number of times the prior entry in the data entry field has been entered through prior entries. The method further includes returning the entry in the parent field of the record having the greatest count in the frequency field as the default field value.

A further system consistent with the present invention for entering a default field value in a data entry field based on prior entries in the data entry field includes: a memory; and a microprocessor coupled to the memory. The microprocessor is programmed to: establish a frequency index table, the frequency index table including two or more records having at least two fields. The fields include: a parent field containing a prior entry in the data entry field; and a frequency field including a count of the number of times the prior entry in the data entry field has been entered through prior entries. The microprocessor if further programmed to return the entry in the parent field of the record having the greatest count in the frequency field as the default field value.

A further article of manufacture consistent with the present invention for entering a default field value in a data entry field based on prior entries in the data entry field includes instructions being capable of causing a processor to: establish a frequency index table, the frequency index table including two or more records having at least two fields. The fields include: a parent field containing a prior entry in the data entry field; and a frequency field including a count of the number of times the prior entry in the data entry field has been entered through prior entries. The instructions are further capable of causing the processor to return the entry in the parent field of the record having the greatest count in the frequency field as the default field value.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

The following description refers to the accompanying drawings in which, in the absence of a contrary representation, the same numbers in different drawings represent similar elements. The implementations in the following description do not represent all implementations consistent with the claimed invention. Instead, they are merely some examples of systems and methods consistent with the invention.

Figure 1:
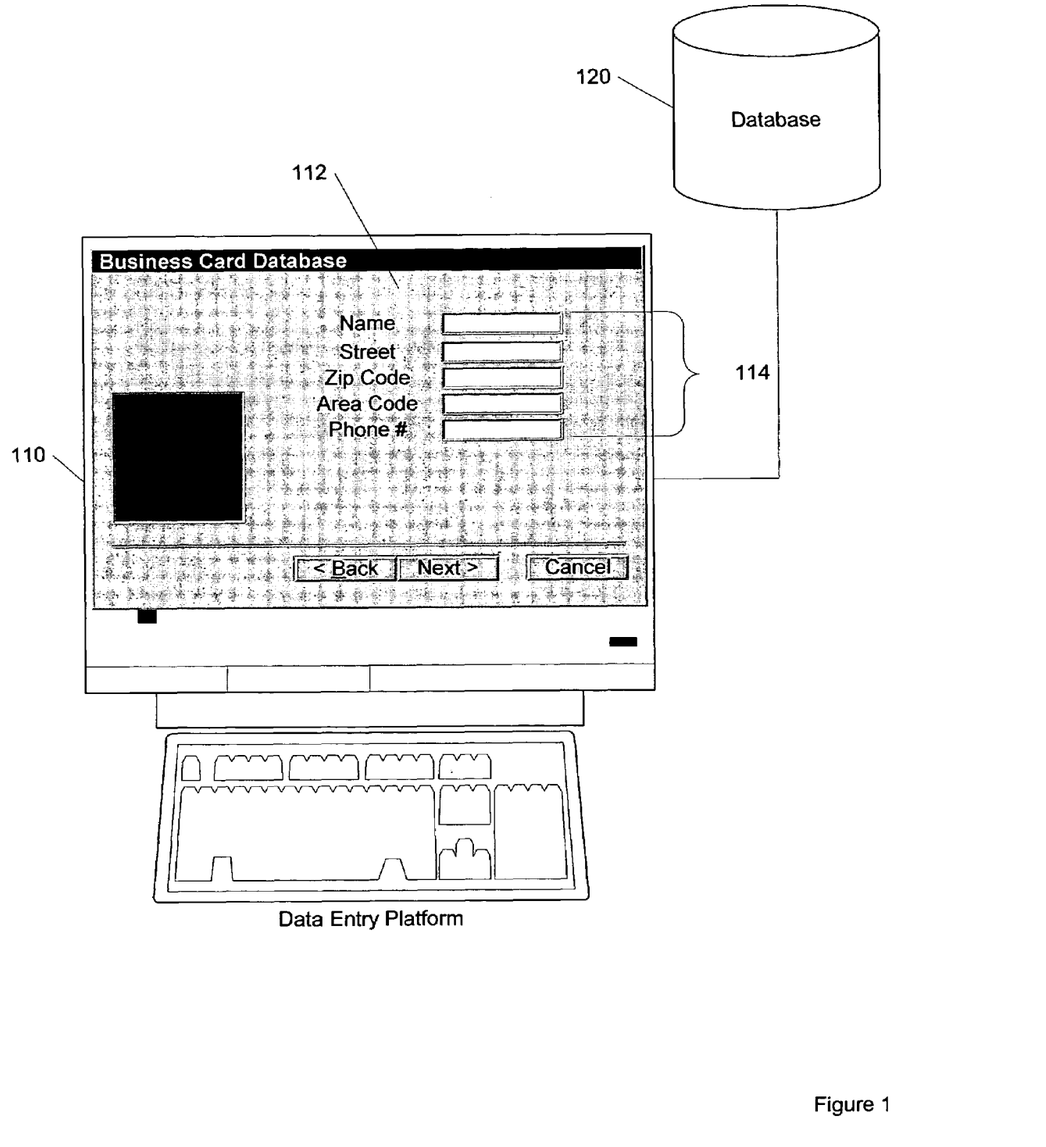
FIG. 1 is an illustration of a system consistent with the present invention for providing statistical defaulting.

FIG. 1 is an illustration of a system consistent with the present invention for providing statistical defaulting. A data entry platform 110 is in communication with a database 120. Data entry platform 110 is used to enter data into one or more data-entry fields 114 of a data entry screen 112. Data entry screen 112 is used as a data entry point for information that is stored in database 120. Typically, data entry screen 112 is a "form oriented screen," having a generally fixed form layout as opposed to a word processing screen or spreadsheet screen that has a more free flowing layout. Databases store form oriented screens by storing a screen identifier associated with the data entry screen, one or more field identifiers that identify the respective data entry fields of the data entry screen, respective contents of the one or more data entry fields, and an indication of the relative placement and order of the one or more data entry fields on the data entry screen. The data entry fields tend to be ordered and numbered in an expected data input order, for example, in Western countries from left to right and top to bottom.

Business applications, such as enterprise resource planning systems like SAP's R/3 systems, use form oriented screens for often repetitive input of data. As data is entered into data entry screen 112, it is saved in database 120. Consistent with the present invention, the data stored in the data entry fields in database 120 may be initially scanned to determine if any correlations exist between data entry fields. For example, a correlation may be found between area codes and zip codes in data entry screen 112. In lieu of, or in addition to, this scanning process, the end user or software developer may identify correlations between data entry fields that are expected because of analysis of prior databases or general knowledge in the art. Index tables may be created as described with respect to the discussion of FIG. 2 below.

Data entry platform 110 may utilize the index tables to make a best guess of a user's data entry in a data entry field, based on the index table reflecting the relationship of the data entry field with a prior data entry field and previous entries in both data entry fields. For example, past history may indicate that the zip code "30311" is usually entered by a user into a zip code data entry field who enters "404" into an area code data entry field. Therefore, the system may make a "best guess" that whenever a user enters "404" into the area code data entry field he is likely to enter "30311" into the zip code data entry field. Therefore, the system may prepopulate the zip code data entry field with "30311." Methods and systems consistent with the principals of the present invention are more fully explained below.

Figure 2:
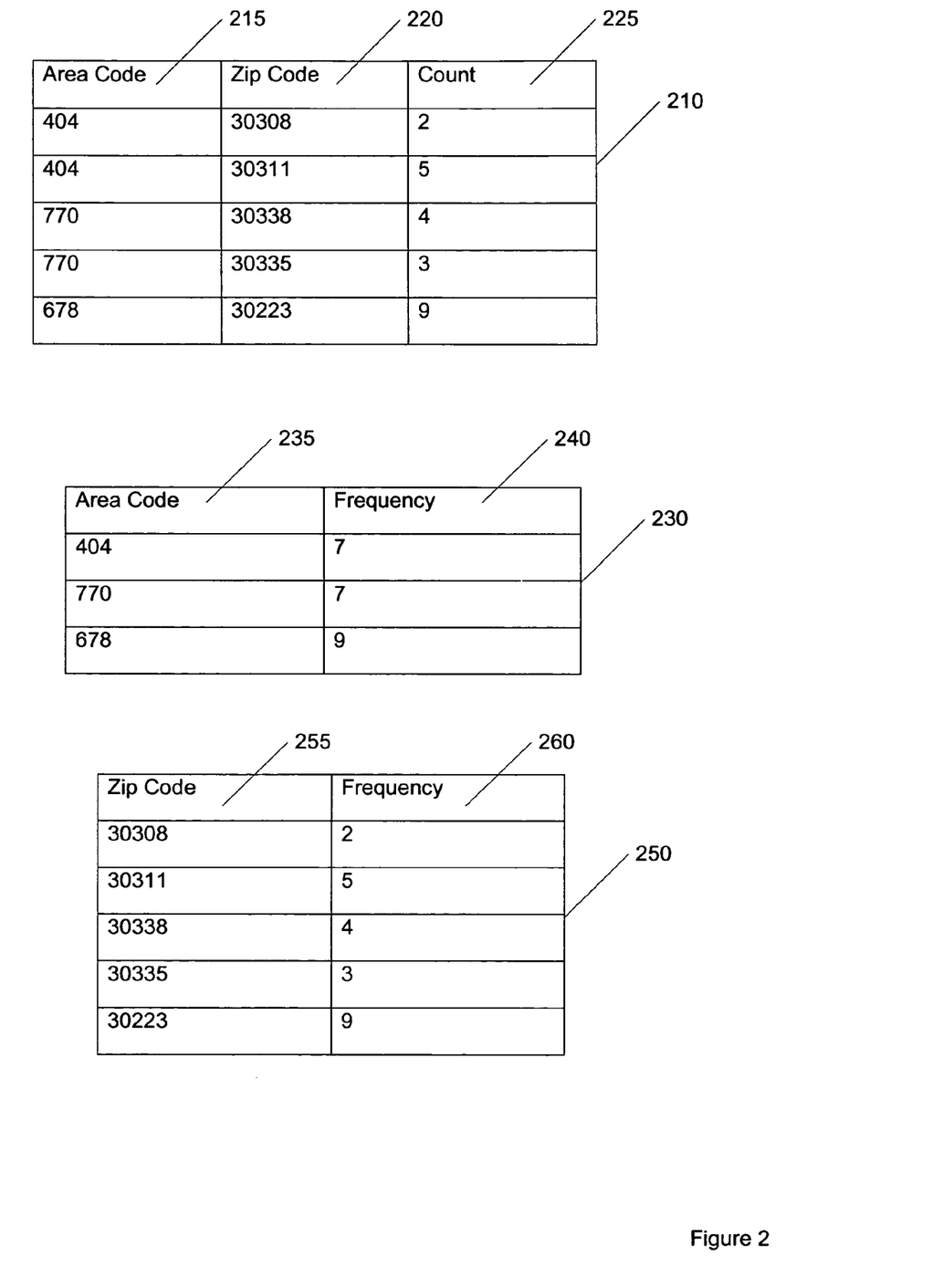
FIG. 2 illustrates three index tables for the entry screen consistent with the present invention.

FIG. 2 illustrates three index tables created in association with data entry screen 110 consistent with the present invention. Data entry fields with significant correlations may be indexed and associated with each other through one or more index tables 210, 230, 250 that may be stored in database 120. The one or more index tables 210, 230, 250 reflect the relationship of the contents of a first data entry field with the contents of a second data entry field. "First data entry field" and "second data entry field" are not absolute terms of the placement of the fields on the data entry screen, but rather are terms that may indicate the relative order of the fields to each other in some embodiments. A relational index table 210 may be created for a correlation between a first data entry field, for example, area code, and a second data entry field, for example, zip code.

A correlated data entry field is known as a root data entry field if there is no relationship between it and a previous data entry field in the data entry field order of the data entry screen. In our example, the area code data entry field does not bear any correlation to previously entered data entry fields, for example, name or street address; therefore, the area code data entry field may be known as a root data entry field.

Relational index table 210 is associated with the first data entry field and the second data entry field and may contain multiple records, each record having three fields: a parent field 215, reflecting prior data entries from the first data entry field; a child field 220, reflecting prior data entries from the second data entry field; and a frequency field 225, reflecting the number of times that the unique combination of entries in the first data entry field and the second data entry field occurred.

For each record, the entry in parent field 215 is the entry from the first data entry field that is associated with the entry in child field 220. For example, in relational index table 210, the first record indicates that when "404" has been entered in the area code field, or first data entry field, on two occasions "30308" has been entered in the zip code field, or second data entry field. The second record indicates that when "404" has been entered in the area code field, or first data entry field, on five occasions "30311" has been entered in the zip code field, or second data entry field. An examination of exemplary relational index table 210 indicates that based on past history, there is a 5 in 7 chance that if "404" is entered as an area code in the first data entry field, the zip code will be "30311."

First frequency index table 230 includes two fields: a parent field 235, indicating past entries in the first data field; and a frequency count field 240, indicating the number of times that the first data field entry has been entered. Second frequency index table 250 includes two fields: a child field 255, indicating past entries in the second data field; and a frequency count field 260, indicating the number of times that the second data field entry has been entered.

Utilizing index tables 210, 230, 250, data entry platform 110 can anticipate entries and prepopulate data entry field, such as the first data entry field, area code, and the second data entry field, zip code. For example, prior to a user typing anything into the area code field, the system may prepopulate the area code field with the most likely area code, which is "678" as determined from frequency table 230. In addition, because of the relationship between the area code field and the zip code field, once an area code has been entered by the user, for example "404," the system may prepopulate the zip code field with the most likely entry as determined from an examination of relational index table 210. In this case, the system would prepopulate the zip code with "30311," which has a 5 in 7 chance of being correct. Further techniques for prepopulating the fields will be discussed later.

Figure 3:
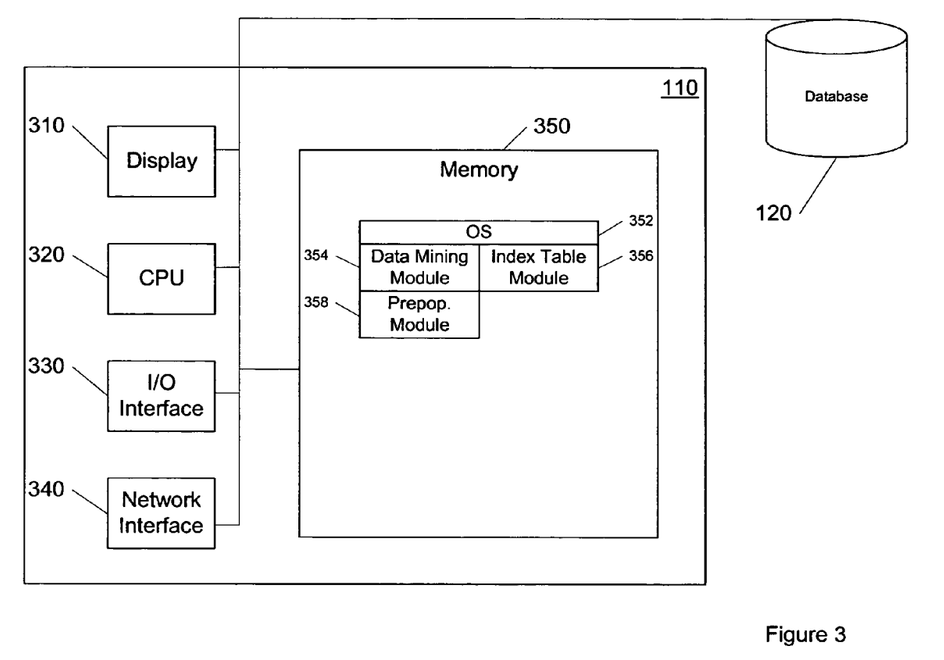
FIG. 3 is a block diagram of hardware components of a data entry platform consistent with the present invention.

FIG. 3 is a block diagram of hardware components of a data entry platform consistent with the present invention. Among the many implementation options described above, data entry platform 110 may be a general-purpose computer running a computer program or a specially constructed computing platform for carrying-out the operations described below. Data entry platform 110, having CPU 320, may conduct statistical defaulting and interfacing to database 120 via I/O interface 330 (which can be any conventional I/O device) or network interface 340 (which can be any conventional interface) by direct connections or other communication links. Data entry platform 110 may also provide a local or remote display 310.

Alternatively, data entry platform 110 can be part of a network such as a telephone-based network (such as a PBX or POTS), a local area network (LAN), a wide area network (WAN), a dedicated intranet, and/or the Internet. In this way, data entry platform 110 may be located near or far from database 120.

Memory device 350 may be implemented with various forms of memory or storage devices, such as read-only memory, random access memory, or external devices. Typically, memory device 350 stores instructions forming an operating system 352; a data mining module 354 for providing data mining functions that analyze database 120 for correlations; an index table module 356 for generating, populating, and updating the one or more index tables stored in database 120; and a prepopulating module 358 for prepopulating the data entry fields based on one or more of the index tables in database 120 and a user's keystrokes.

Figure 4:
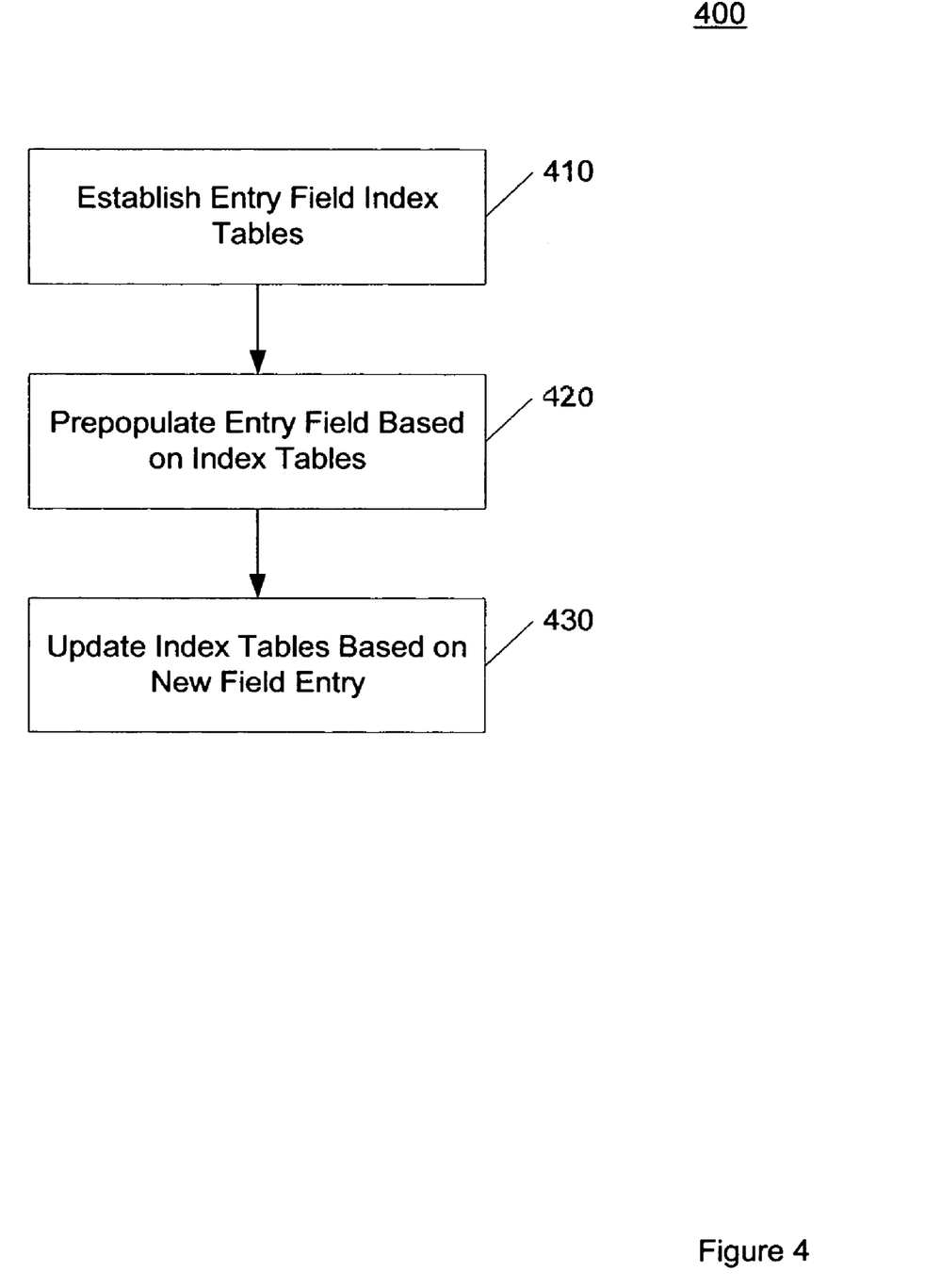
FIG. 4 is a flowchart of a statistical defaulting process consistent with the present invention.
Figure 5:
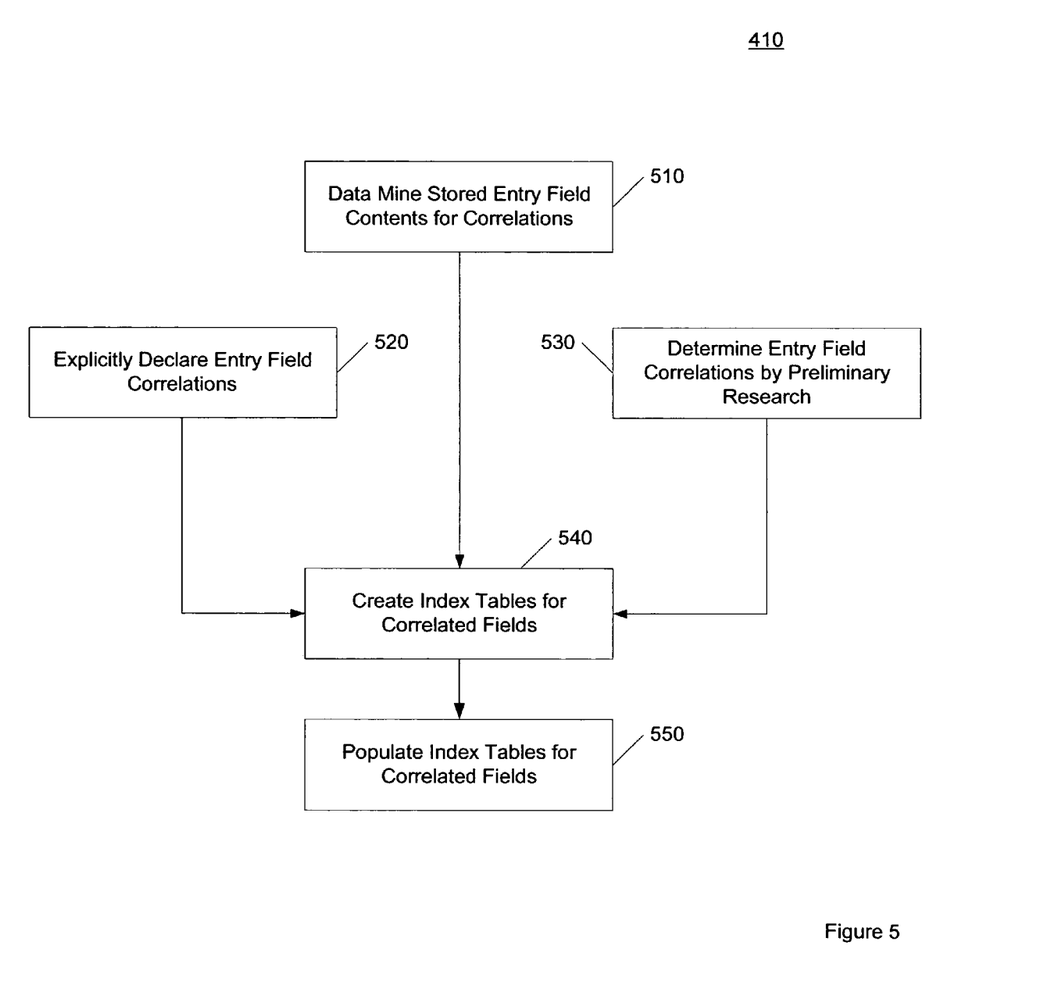
FIG. 5 is an illustration of an index table creation process consistent with the present invention.
Figure 7:
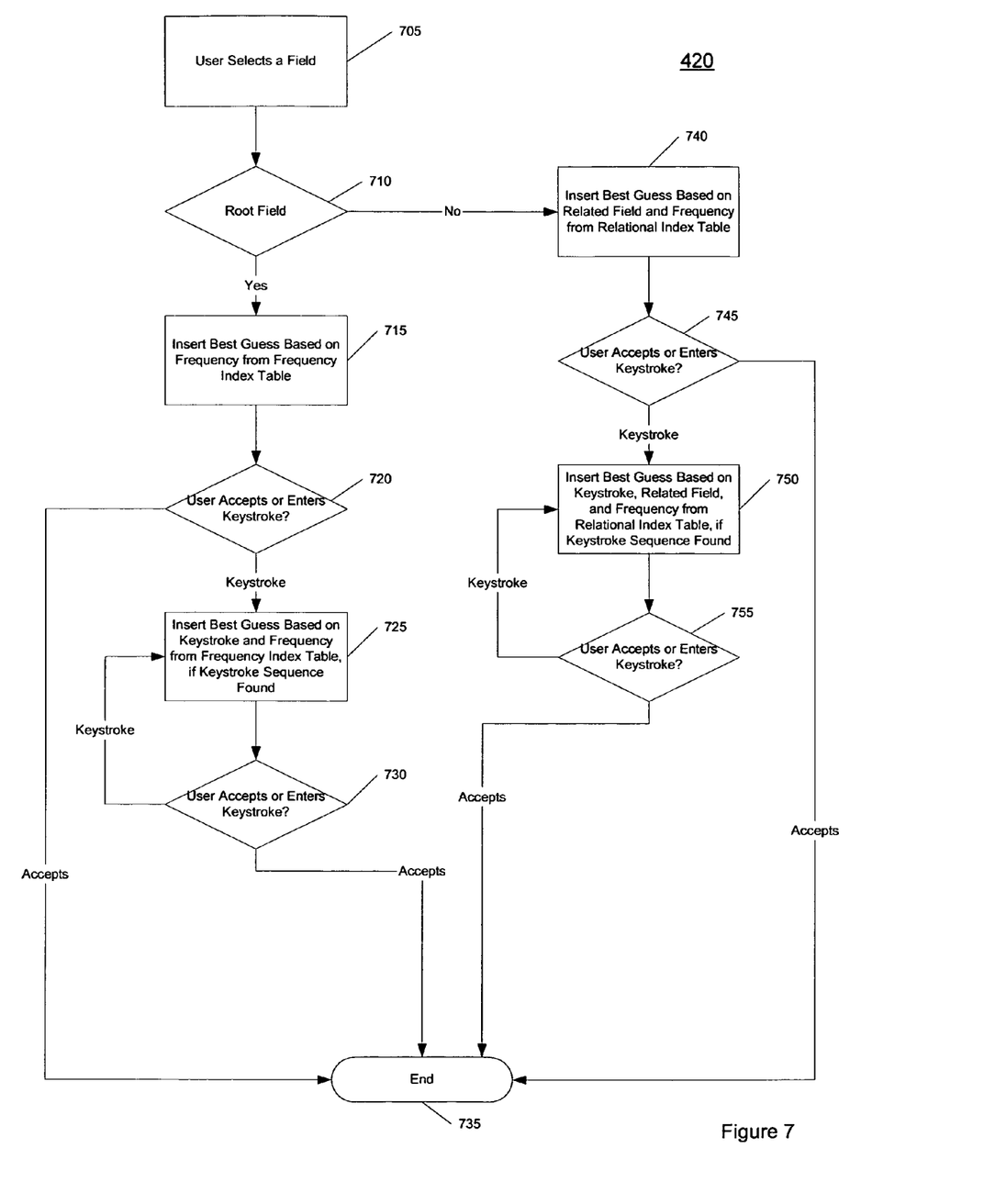
FIG. 7 is a flowchart of an data entry field prepopulation process consistent with the present invention.

FIGS. 4, 5, and 7 are flowcharts providing more detail on an exemplary statistical defaulting processes, which the modules described above, or other modules, can carry out. Those skilled in the art will appreciate that the process flows may be implemented in a variety of fashions. Although these flowcharts illustrate most features of the processes, they may, for purposes of clarity, omit some features in the following text.

FIG. 4 is a flowchart of a statistical defaulting process consistent with the present invention. As previously described with reference to FIG. 1, the statistical defaulting process 400 consistent with the present invention may comprise three stages: an establishment stage 410; a pre-population stage 420; and an updating stage 430. Data mining module 354 may statistically analyze the stored data entry contents associated with data entry screen 110 (stage 410). The analysis may yield correlations between two or more data entry fields of data entry screen 110. When correlations are found, index table module 356 may create one or more index tables. The operation of data mining module 354 and index table module 356 are more fully explained with reference to FIG. 5 below.

Following analysis and creation of the one or more index tables, prepopulating module 358 may prepopulate one or more of the correlated data entry fields. Root data entry fields may be initially prepopulated with the most likely value as determined from an associated frequency entry table. Second data entry fields may be prepopulated based on one or more of the first data entry field, the entries in the associated relational index table, and user keystrokes. The operation of prepopulating module 354 is more fully explained with reference to FIG. 7 below.

Following entry of data into a correlated data entry field, index table module 356 analyzes the entry to see if it is an entry that is not previously found in the relational index table or the associated frequency index table (stage 430). If it is not found, new records are created in one or both tables. A record may be created in the associated frequency index table noting an initial frequency of "1" because this is the first instance of the new data.

A record may also be created in one or more relational index tables. If the new data is in a second data field of a data entry screen, a new data record may be created in the relational index table, placing the new data in the child field and the associated first data field data in the parent field, as well as placing a "1" in the frequency field. If the new data is in a first data field of a data entry screen, a new data record may be created in the relational index table, placing the new data in the parent field and later placing the associated child field entry following entry of the second data entry field data, as well as placing a "1" in the frequency field. Thus, index table module 356 may "learn" and update the index tables in database 110 to reflect ongoing data entries. Updated index tables are illustrated and described with respect to FIG. 8.

FIG. 5 is an illustration of an index table creation process 410 consistent with the present invention. As described above, data mining module 354 may statistically analyze the stored data entry contents associated with data entry screen 110 (stage 510). The system may also use text mining, machine learning, or statistical techniques, in addition to data mining techniques to look for correlations between data entry fields.

In addition to, or in place of, the above described techniques, a software developer may declare the correlations to exist (stage 520). For example, if a developer would expect a strong dependency of a second field on a first field, the developer may directly tell data mining module 354 of the relationship.

In another alternative technique for establishing relationships between data entry fields, a developer, vendor, or customer may use preliminary research to determine and declare relationships between data entry fields (stage 530). For example, a vender, such as SAP, may apply data mining techniques on pre-existing databases from systems to be replaced. The results of this research may permit the vendor to predefine the relationships between the data entry fields. Using this latter technique, the method described with respect to stage 510 may be partially or completely bypassed once the new system is installed, with the advantage being that no user input is required in the new system prior to establishing the relationships.

Once the field relationships have been determined, index table module 356 may create one or more index tables (stage 540). A relational index table may be created, such as relational index table 210. The relational index table associates a first data entry field and a second data entry field and may contain multiple records. Each record may have three fields: a parent field reflecting prior data entries from the first data entry field; a child field reflecting prior data entries from the second data entry field; and a frequency field reflecting the number of times that the unique combination of entries in the first data entry field and the second data entry field occurred. The relational index table may be used to make a "best guess" of the entry of a second data entry field based one or more of: the entry that the user has placed in a first data entry field; the frequency of entries in the second data entry field that are associated with the entry in the first data entry field; and one or more keystrokes.

In addition, index table module 356 may create a frequency index table for one or both associated data entry fields. A frequency index table, such as frequency index table 230, may include two fields: a parent field indicating past entries in the data entry field; and a frequency count field indicating the number of times that the data field entry has been entered. The frequency index table may be used to make a "best guess" of the entry of a data entry field based on the previous entries in that data entry field.

Once the one or more index tables are created, the index table module 356 populates the index tables based on prior user entry stored in database 120 (stage 550). The table may also be populated by a developer, vendor, or customer based, for example, on preliminary research or general knowledge of the art.

Figure 6:
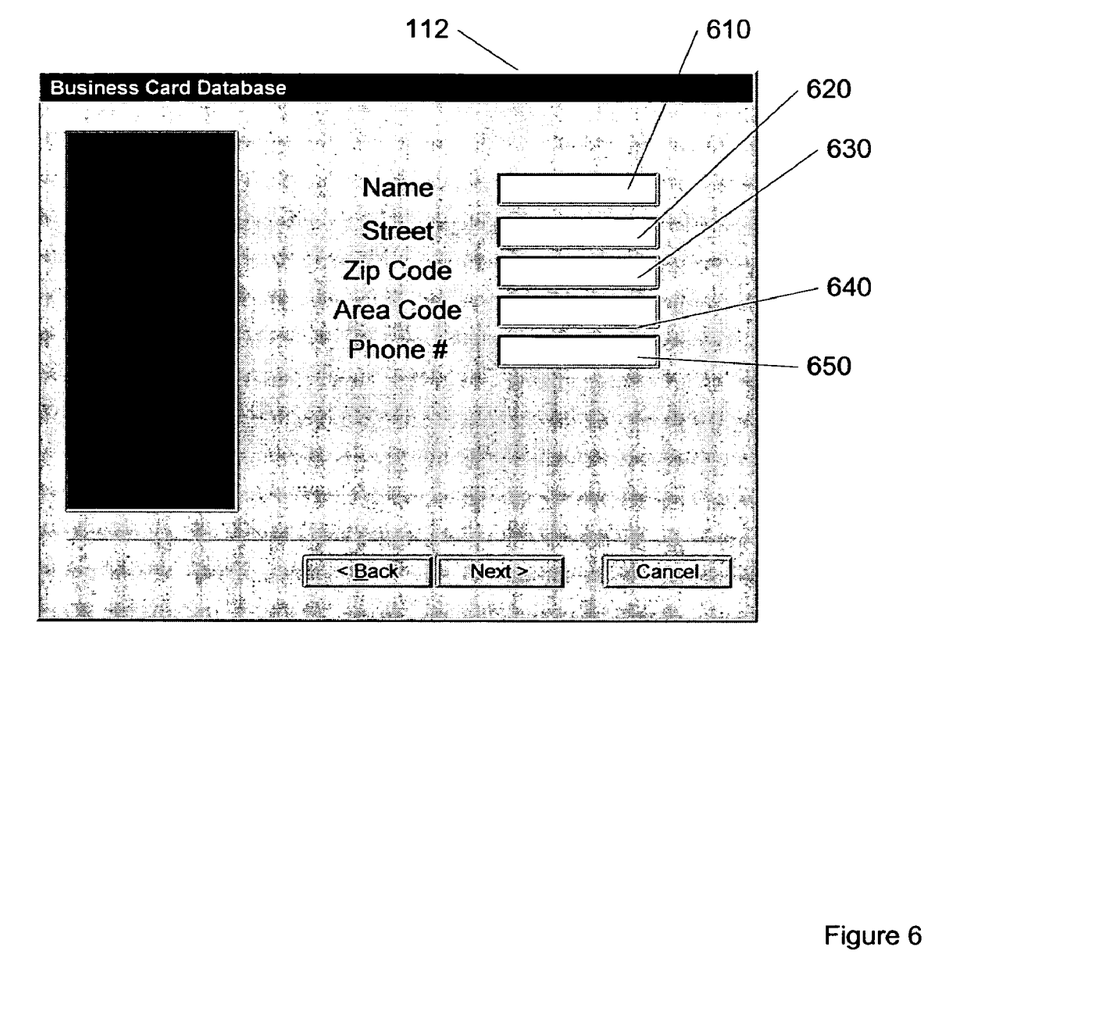
FIG. 6 is a data entry screen consistent with the present invention.

FIG. 6 is a data entry screen 112 consistent with the present invention. As previously discussed, data entry screen 112 is used as a data entry point for information that is stored in database 120. Typically, data entry screen 112 is a "form oriented screen," having a generally fixed form layout as opposed to a word processing screen or spreadsheet screen that has a more free flowing layout. Database 120 may store data entry screen 112 by storing a screen identifier associated with data entry screen 112, one or more field identifiers that identify the respective data entry fields 610-650 of data entry screen 112, respective contents of the one or more data entry fields 610-650, and an indication of the relative placement and order of the one or more data entry fields 610-650 on the data entry screen 112. The data entry fields 112 tend to be ordered and numbered in an expected data input order, for example, in Western countries from left to right and top to bottom. Prepopulating module 358 may take advantage of the ordered, numbering of data entry fields 610-650 to prepopulate one or more of data entry fields 610-650 using the one or more index tables.

FIG. 7 is a flowchart of an data entry field prepopulation process 420 consistent with the present invention. Prepopulating module 358 is activated when the user selects a data entry field (stage 705). Prepopulating module 358 examines the selected data entry field to determine if it is a root data entry field, i.e., a data entry field that has no dependence upon any other data entry field (stage 710). If it is a root field, prepopulating module 358 looks in the associated frequency index table to make a best guess of the user's input by, for example, selecting the parent field entry having the highest frequency (stage 715). Prepopulating module 358 may then prepopulate the selected data entry field with the previous entry having the highest frequency count.

If the user accepts the input, for example by hitting the "Enter," "Tab," or "Return" keys, prepopulating module 358 ends execution for this data entry field (stage 720). If the user hits a keystroke, the prepopulating module 358 may examine the associated frequency index table for a matching parent field entry, i.e., one whose beginning letters match the keystroke. Prepopulating module 358 may then select the matching parent field entry having the highest frequency and prepopulate the date entry field with the matching, highest scoring entry (stage 725). If the user accepts the entry, prepopulating module 358 ends execution for this data entry field (stage 730). Otherwise, prepopulating module 358 continues accepting more keystrokes and analyzing the entries in the frequency index table (stage 725). If no matches are found, prepopulating module 358 may offer no entry and may save the new entry for later use by index table module 356.

Returning to stage 710, if the selected data entry field is not a root field, prepopulating module 358 will select the appropriate relational index table and insert a best guess in the selected data entry field (stage 740). The best guess may be selected by looking up the user's entry in the parent data entry field associated with the currently selected data entry field (the child field). Prepopulating module 358 may select the entry from the child field that has the greatest frequency for the user's parent entry. Prepopulating module 358 may then prepopulate the data entry field with this selection. If the user accepts the entry, prepopulating module 358 ends execution for this data entry field (745).

If the user hits a keystroke, the prepopulating module 358 may examine the associated relational index table for a matching child field entry, i.e., one whose beginning letters match the keystroke. Prepopulating module 358 may then select the matching child field entry having the highest frequency and prepopulate the date entry field with the matching, highest scoring entry (stage 750). If the user accepts the entry, prepopulating module 358 ends execution for this data entry field (stage 750). Otherwise, prepopulating module 358 continues accepting more keystrokes and analyzing the entries in the relational index table (stage 755). If no matches are found, prepopulating module 358 may offer no entry and may save the new entry for later use by index table module 356.

Figure 8:
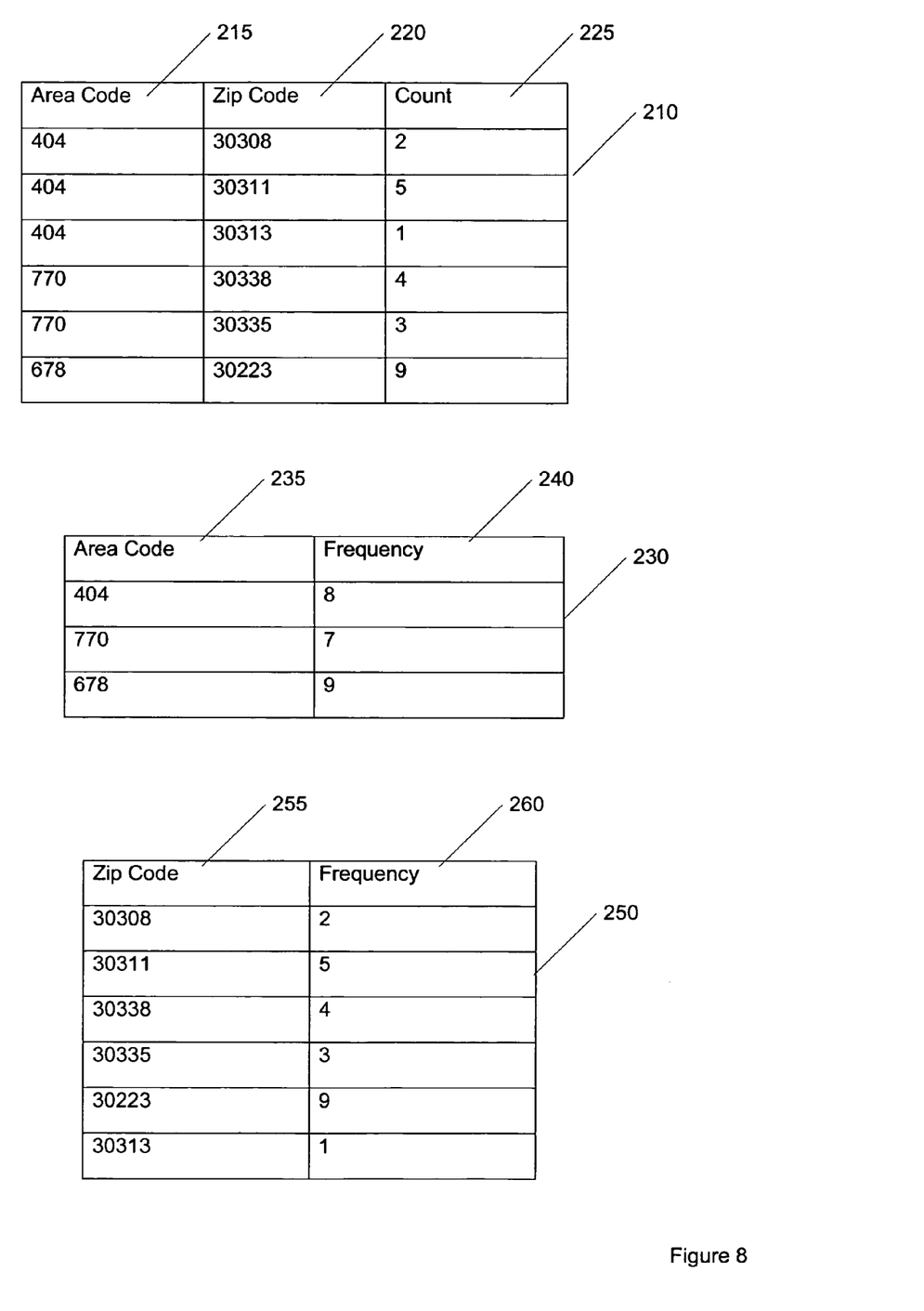
FIG. 8 illustrates the three index tables for the entry screen following entry of data not previously entered consistent with the present invention.

As described above, at times a user may enter data in a data entry field that has not before been entered. FIG. 8 illustrates index tables 210, 230, 250 for the data entry screen following entry of data not previously entered. This screen reflects the status of index tables 210, 230, 250 following entry of a new entry, "30313," that had not previously been entered and was not previously associated with the "404" entry for area code. Note that index table module 356 has updated relational index table 210 to reflect the new entry, as well as, updating frequency index table 260 to note the new area code.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in may other ways, using equivalents and alternatives that do not depart from the scope of the following claims. Moreover, unless indicated to the contrary in the preceding description, none of the components described in the implementations is essential to the invention.

What is claimed is:

1. A method of entering a default field value in a second data entry field based on a user's current entry in a first data entry field, the first and second data entry fields being separately displayed on a screen, comprising:
   establishing a relational index table, the relational index table including at least two records, the records having at least three fields, the fields including:
      a parent field containing a prior entry in the first data entry field,
      a child field containing an associated prior entry in the second data entry field, and
      a frequency field including a count of the number of times the prior entry in the first data entry field was associated with the associated prior entry in the second data entry field;
   receiving the user's current entry in the first data entry field; and
   matching the user's current entry in the first data entry field to the prior entry in the parent field of the relational index table and returning the associated prior entry in the child field having the greatest count from the frequency field as the default field value; and
   automatically entering the default field value into the second data entry field.

2. The method of claim 1, further including:
   receiving a keystroke from the user; and
   further wherein matching includes looking up the user's current entry in the first data entry field in the parent field of the relational index table and returning the associated prior entry in the child field having a first character matching the keystroke received from the user as the default field value.

3. The method of claim 1, wherein the parent field, the child field, and the frequency field am contained in one relational index table.

4. A system for entering a default field value in a second data entry field based on a user's current entry in a first data entry field, the first and second data entry fields being separately displayed on a screen, the system comprising:
   a memory; and
   a microprocessor coupled to the memory and programmed to:
      establish a relational index table, the relational index table including at least two records, the records having at least three fields, the fields including:
         a parent field containing a prior entry in the first data entry field;
         a child field containing an associated prior entry in the second data entry field; and
         a frequency field including a count of the number of times the prior entry in the first data entry field was associated with the associated prior entry in the second data entry field;
      receive the user's current entry in the first data entry field;
      match the user's current entry in the first data entry field to the prior entry in the parent field of the relational index table and return the associated prior entry in the child field having the greatest count from the frequency field as the default field value; and
      automatically enter the default field value into the second data entry field.

5. The system of claim 4, wherein the microprocessor is further programmed to:
   receive a keystroke from the user; and
   match the user's current entry in the first data entry field to the prior entry in the parent field of the relational index table and return the associated prior entry in the child field having a first character matching the keystroke received from the user as the default field value.

6. The method of claim 4, wherein the parent field, the child field, and the frequency field am contained in one relational index table.

7. An article of manufacture comprising instructions for entering a default field value in a second data entry field based on a user's current entry in a first data entry field, the first and second data entry fields being separately displayed on a screen, the instructions being capable of causing a processor to:
   establish a relational index table, the relational index table including at least two records, the records having at least three fields, the fields including:
      a parent field containing a prior entry in the first data entry field;
      a child field containing an associated prior entry in the second data entry field; and
      a frequency field including a count of the number of times the prior entry in the first data entry field was associated with the associated prior entry in the second data entry field;
   receive the user's current entry in the first data entry field;
   match the user's current entry in the first data entry field to the prior entry in the parent field of the relational index table and return the associated prior entry in the child field having the greatest count from the frequency field as the default field value; and
   automatically enter the default field value into the second data entry field.

8. The article of manufacture of claim 7, wherein the instructions are further capable of causing a processor to:
   receive a keystroke from the user; and
   match the user's current entry in the first data entry field to the prior entry in the parent field of the relational index table and return the associated prior entry in the child field having a first character matching the keystroke received from the user as the default field value.

9. The method of claim 7, wherein the parent field, the child field, and the frequency field are contained in one relational index table.

10. A method of entering a default field value in a data entry field based on prior entries in the data entry field, comprising:
    establishing a frequency index table, the frequency index table including two or more records having at least two fields, the fields including:
       a parent field containing a prior entry in the data entry field; and
       a frequency field including a count of the number of times the prior entry in the data entry field has been entered through prior entries;
    prior to receiving current input in the data entry field from the user, triggering the return of the prior entry in the parent field of one of the records having the greatest count in the frequency field, this returned prior entry being the default field value; and automatically entering the default field value into the data entry field.

11. The method of claim 10, further including:
receiving a keystroke from the user; and
further wherein returning the prior entry in the parent field includes returning the prior entry in the parent field having a first character matching the keystroke received from the user as the default field value.

12. The method of claim 11, wherein returning the entry in the parent field includes:
finding a record group from the two or more records, the record group having prior entries in the parent field having a first character matching the keystroke received from the user; and
returning the prior entry in the parent field of the record within the record group having the greatest count in the frequency field as the default field value.

13. A system for entering a default field value in a data entry field based on prior entries in the data entry field comprising:
a memory; and
a microprocessor coupled to the memory and programmed to:
establish a frequency index table, the frequency index table including two or more records having at least two fields, the fields including:
a parent field containing a prior entry in the data entry field; and
a frequency field including a count of the number of times the prior entry in the data entry field has been entered through prior entries;
prior to receiving current input in the data entry field from the user, trigger the return of the prior entry contained in the parent field of the record having the greatest count in the frequency field, this returned prior entry being the default field value; and
automatically enter the default field value into the data entry field.

14. The system of claim 13, wherein the microprocessor is further programmed to:
receive a keystroke from the user; and
return the entry in the parent field having a first character matching the keystroke received from the user as the default field value.

15. The system of claim 14, wherein the microprocessor is further programmed to:
find two or more records having entries in the parent field having a first character matching the keystroke received from the user; and
return the entry in the parent field of the record having the greatest count in the frequency field as the default field value.

16. An article of manufacture containing instructions for entering a default field value in a data entry field based on prior entries in the data entry field, the instructions being capable of causing a processor to:
establish a frequency index table, the frequency index table including two or more records having at least two fields, the fields including:
a parent field containing a prior entry in the data entry field; and
a frequency field including a count of the number of times the prior entry in the data entry field has been entered through prior entries;
prior to receiving current input in the data entry field from the user, trigger the return of the prior entry contained in the parent field of the record having the greatest count in the frequency field, this returned prior entry being the default field value; and
automatically enter the default field value into the data entry field.

17. The article of manufacture of claim 16, wherein the instructions are further capable of causing a processor to:
receive a keystroke from the user; and
return the entry in the parent field having a first character matching the keystroke received from the user as the default field value.

18. The article of manufacture of claim 17, wherein the instructions are further capable of causing a processor to:
find two or more records having entries in the parent field having a first character matching the keystroke received from the user; and
return the entry in the parent field of the record having the greatest count in the frequency field as the default field value.

* * * * *